United States Patent
Inada et al.

(10) Patent No.: US 6,752,004 B2
(45) Date of Patent: Jun. 22, 2004

(54) MISFIRE DETECTION APPARATUS FOR INTERNAL COMBUSTION ENGINE

(75) Inventors: Takahiko Inada, Tokyo (JP); Kimihiko Tanaya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 45 days.

(21) Appl. No.: 10/287,629

(22) Filed: Nov. 5, 2002

(65) Prior Publication Data

US 2003/0217587 A1 Nov. 27, 2003

(30) Foreign Application Priority Data

May 27, 2002 (JP) ...................................... 2002-151997

(51) Int. Cl.$^7$ ............................................. G01M 15/00
(52) U.S. Cl. ..................... 73/35.08; 73/117.3
(58) Field of Search ............................. 73/35.01, 35.03, 73/35.04, 35.06, 35.07, 35.08, 116, 117.2, 117.3, 118.1; 701/101, 102, 111

(56) References Cited

U.S. PATENT DOCUMENTS

| 4,565,087 | A | * | 1/1986 | Damson et al. ............ 73/35.04 |
| 4,665,737 | A | * | 5/1987 | Britsch et al. ............. 73/35.08 |
| 5,954,024 | A | * | 9/1999 | Duhr et al. ................. 123/310 |
| 6,125,691 | A | * | 10/2000 | Hohner et al. ............. 73/35.08 |
| 6,615,645 | B1 | * | 9/2003 | Butler et al. ............... 73/117.3 |
| 2003/0200023 | A1 | * | 10/2003 | Matsushita et al. ......... 701/114 |
| 2003/0200789 | A1 | * | 10/2003 | Tanaya ...................... 73/35.08 |

FOREIGN PATENT DOCUMENTS

JP 2001-90647 4/2001

* cited by examiner

*Primary Examiner*—Eric S. McCall
(74) *Attorney, Agent, or Firm*—Sughrue Mion, PLLC (57) ABSTRACT

A misfire detection apparatus for an internal combustion engine is capable of accurately determining an occurrence of combustion or misfiring in each cylinder of the engine even when an ionic current superposed on a leakage current decreases monotonously to provide no period or range in which the ionic current increases. An ionic current detector 3 detects an ionic current signal corresponding to an ionic current generated when an air fuel mixture in each combustion chamber of the engine is combusted. A gradient detector 6, 7, 8 detects, after firing of the air fuel mixture, a first gradient of the ionic current signal at first detection intervals and a second gradient of the ionic current signal at second detection intervals longer than the first detection intervals. A determination of combustion or misfiring in each combustion chamber is made based on the first and second gradients.

9 Claims, 9 Drawing Sheets

MISFIRE DETECTION APPARATUS FOR INTERNAL COMBUSTION ENGINE

BACKGROUND OF THE INVENTION

1. Field of the Invention

The present invention relates to a misfire detection apparatus for an internal combustion engine capable of detecting combustion and misfiring in cylinders of the engine according to a change in the amount of ions generated by the combustion of an air fuel mixture.

2. Description of the Related Art

It is generally known that ions are generated when an air fuel mixture is burnt or combusted in cylinders (i.e., combustion chambers) of an internal combustion engine. Thus, using a probe arranged in each cylinder and impressed with a high voltage as a bias voltage, the ions thus generated can be observed as an ionic current whose magnitude corresponds to the amount of ions generated. That is, the occurrence of combustion or misfiring in all the cylinders can be individually detected or determined by detecting the presence or absence of such an ionic current.

However, soot might sometimes adhere to the electrodes of a spark plug installed in each cylinder as a result of combustion of the air fuel mixture depending upon the operating condition of the internal combustion engine.

Figure 8:
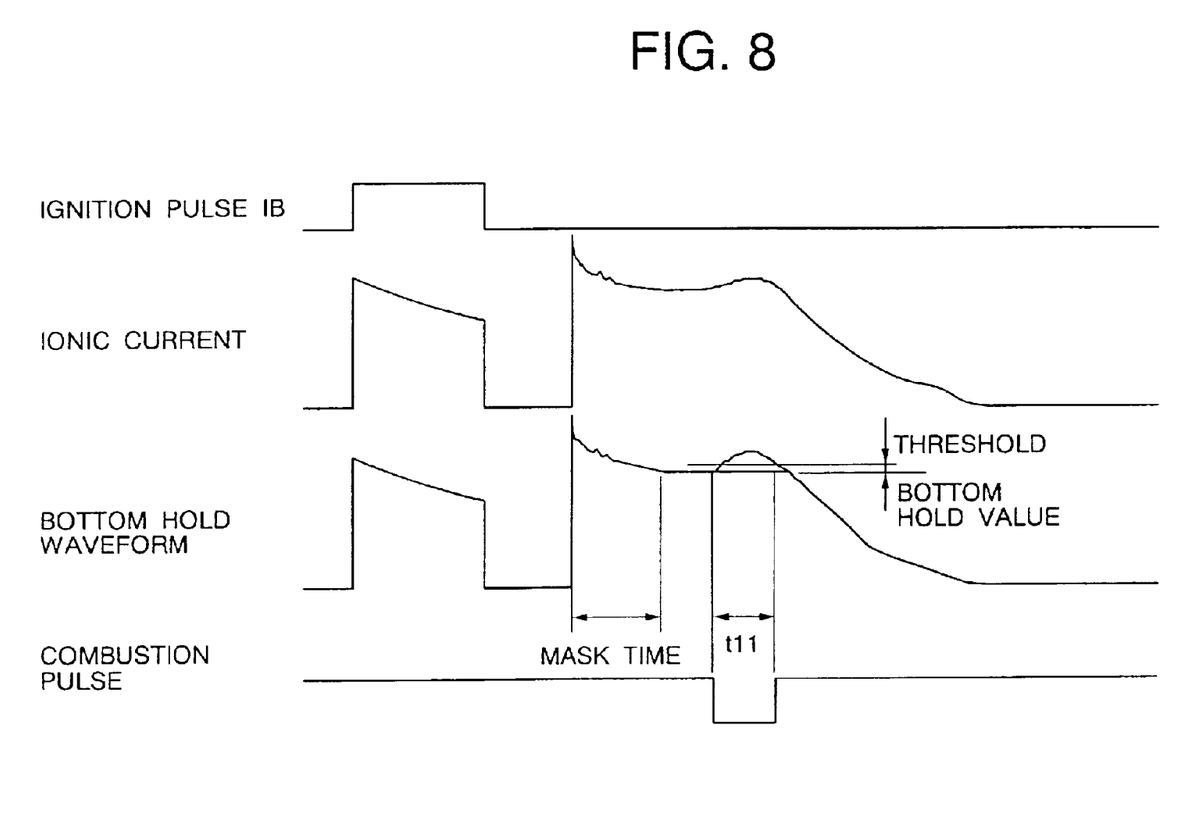
FIG. 8 is a timing chart illustrating the operation of a conventional misfire detection apparatus for an internal combustion engine.
Figure 9:
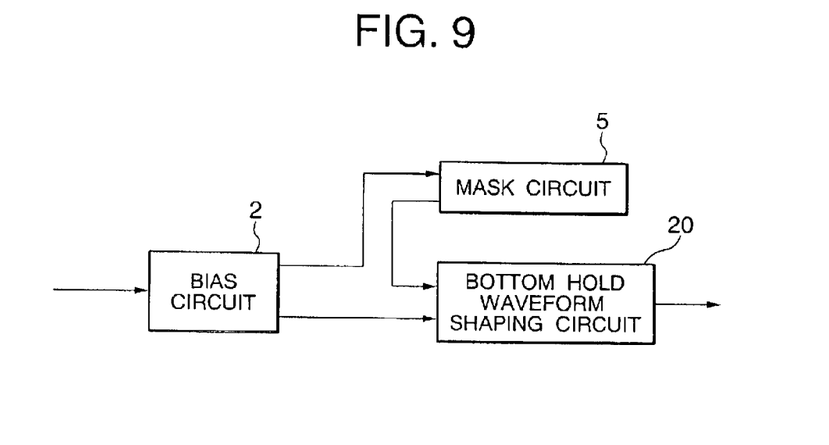
FIG. 9 is a block diagram illustrating the construction of the conventional misfire detection apparatus for an internal combustion engine.

FIG. 8 is an explanatory view that shows the operation of a conventional misfire detection apparatus for an internal combustion engine disclosed in Japanese Patent Laid-Open No. 2001-90647, and FIG. 9 is a block diagram showing the construction of the conventional misfire detection apparatus.

For instance, assuming that a bias voltage is 100 V and the insulation resistance of a spark plug with soot adhered thereto is 5 MΩ, a leakage current of 20 µA flows. As a result, a leakage current flows into an ionic current detection part while monotonously attenuating at a prescribed time constant in accordance with the impression of an ignition pulse IB, as shown in the FIG. 8. In addition, after the start of discharging of a spark plug, an ionic current generated by combustion of an air fuel mixture flows while being superposed on the leakage current that decreases monotonously and gradually according to a time constant CR which is determined by a high resistance of the sooted ignition plug and a capacitor component C of a bias circuit 2.

In FIG. 9, the bias circuit 2 of the misfire detection apparatus for an internal combustion engine impresses a bias voltage on a spark plug (not shown) installed in each cylinder for firing an air fuel mixture therein, and outputs an ionic current (pulse) superposed on a leakage current generated between the electrodes of the spark plug.

A mask circuit 5 masks pulses in the ionic current, which is output from the bias circuit 2 and waveform shaped with a fixed threshold, for a predetermined period of time thereby to cut or mask noise (e.g., ignition noise, etc.) in the ionic current (i.e., generate a masked signal).

A bottom value of the waveform-shaped ionic current after removal of the mask is held as a bottom hold value, based on which a threshold for determining the presence or absence of an ionic current is set.

After a prescribed mask time has elapsed, the ionic current output from the bias circuit 2 is input to a bottom hold waveform shaping circuit 20 where the level of the ionic current thus input is compared with the threshold which is set based on the bottom hold value. As a result of such a comparison, at the time when the level of the ionic current exceeds the threshold, the bottom hold waveform shaping circuit 20 determines that combustion has taken place, and outputs a combustion pulse.

Thus, the ionic current superposed on the leakage current is waveform shaped into the combustion pulse which is then output. Therefore, it is possible to detect combustion in an explosion cylinder irrespective of the magnitude of the leakage current.

Figure 10:
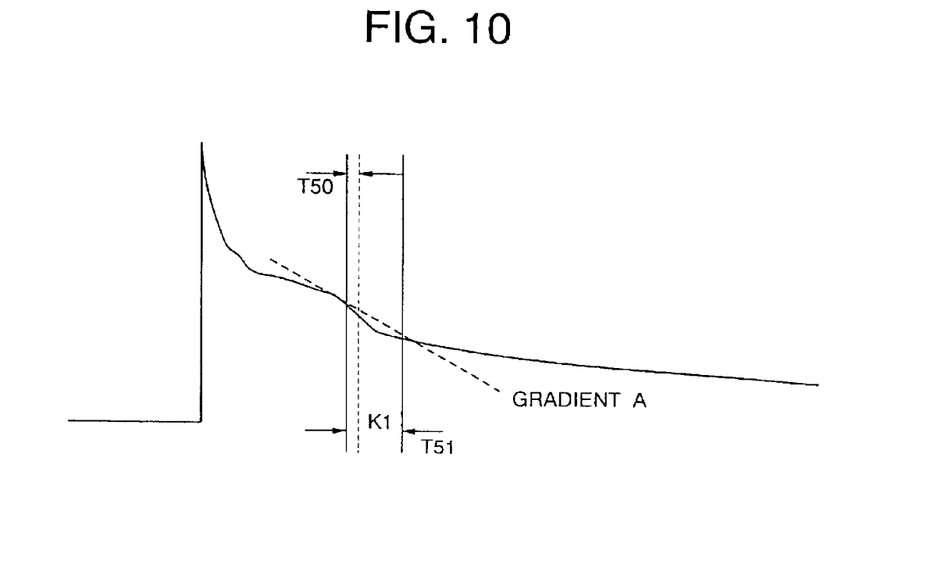
FIG. 10 is an explanatory view explaining the comparative operations of the conventional and present misfire detection apparatuses for an internal combustion engine.

With the conventional misfire detection apparatus for an internal combustion engine as described above, the ionic current superposed on the leakage current decreases monotonously with the passage of time, as shown in FIG. 10 for instance. Accordingly, there has been a problem in that in cases where there is no increasing period or range of the ionic current, as shown by a range t11 in FIG. 8, it is impossible to determine an occurrence of combustion or misfiring based on the bottom hold value.

SUMMARY OF THE INVENTION

The present invention is intended o solve the problem as referred to above, and has for its object to provide a misfire detection apparatus for an internal combustion engine which is capable of accurately determining an occurrence of combustion or misfiring in each cylinder of the engine even when an ionic current superposed on a leakage current decreases monotonously to provide no period or range in which the ionic current increases.

Bearing the above object in mind, the present invention resides in a misfire detection apparatus for an internal combustion engine which includes, an ionic current detector for detecting an ionic current signal corresponding to an ionic current generated when an air fuel mixture in a combustion chamber in each cylinder of the internal combustion engine is combusted, a gradient detector for detecting a first gradient of the ionic current signal at first detection intervals and a second gradient of the ionic current signal at second detection intervals longer than the first detection intervals, and a determiner for determining an occurrence of combustion or misfiring in the combustion chamber based on the first and second gradients of the ionic current signal. According to the above arrangement, combustion or misfiring can be detected in an accurate manner even in cases where a leakage current is generated with an ionic current decreasing monotonously in the absence of any increasing range of the ionic current.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Embodiment 1.

Figure 1:
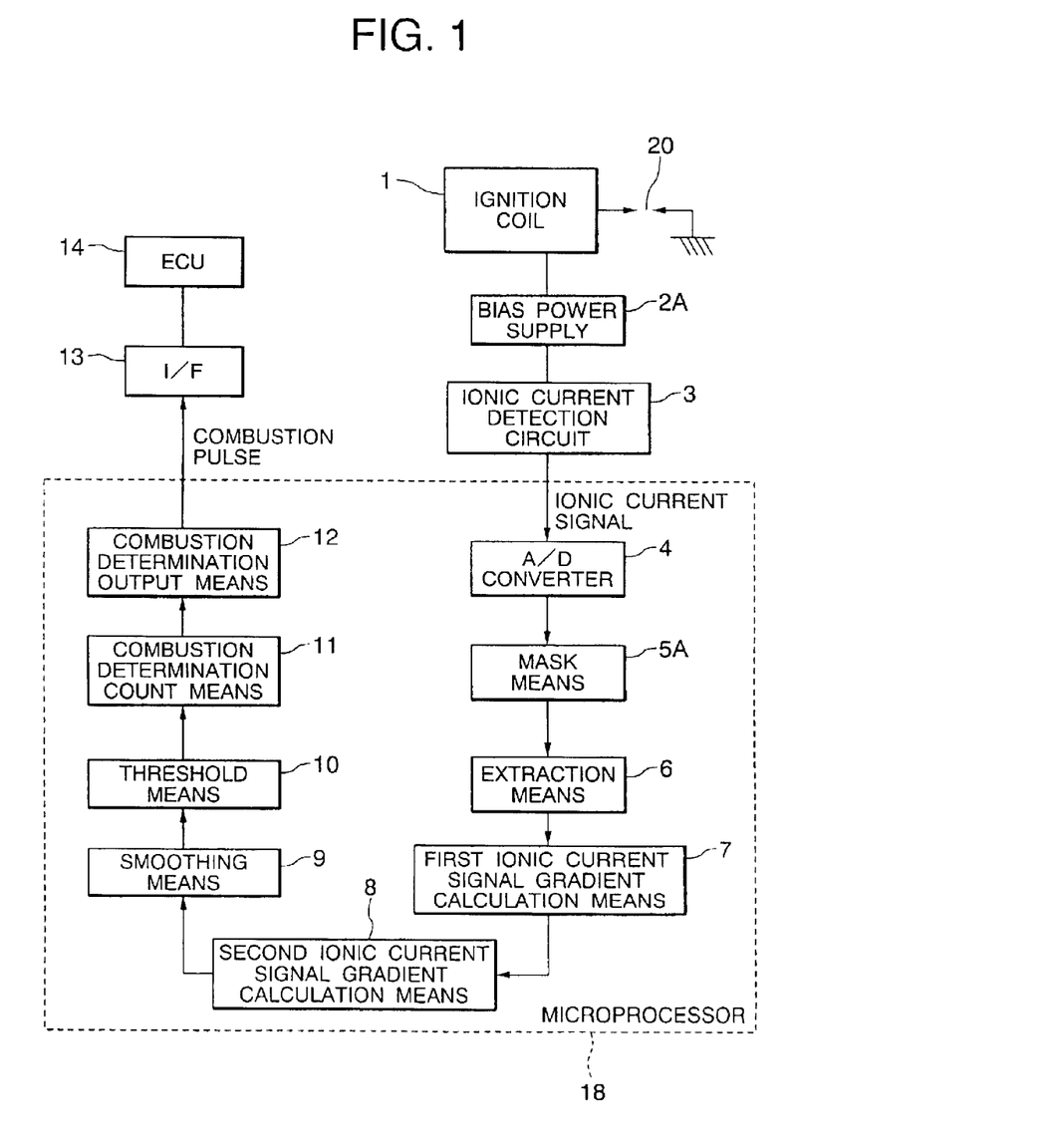
FIG. 1 is a block diagram showing a misfire detection apparatus for an internal combustion engine according to a first embodiment of the present invention.

FIG. 1 is a block diagram showing the construction of a misfire detection apparatus for an internal combustion engine according to a first embodiment of the present invention. In FIG. 1, the same or corresponding parts or elements as those in the above-mentioned conventional apparatus (see FIG. 9) are identified by the same symbols.

In FIG. 1, the misfire detection apparatus for an internal combustion engine includes an ignition coil 1 having a primary winding connected to a power supply (not shown) through a power transistor (not shown) and a secondary winding connected through a distributor (not shown) with a spark plug 20 arranged in each cylinder, a bias power supply (bias circuit) 2A for impressing a bias voltage on the spark plugs 20, an ionic current detection circuit 3 for detecting an ionic current generated upon combustion of an air fuel mixture in each cylinder, an electronic control unit (ECU) 14 for controlling the overall operation of various components of the misfire detection apparatus, and a microprocessor (MPU) (or microcomputer) 18 for determining whether there has taken place combustion or misfiring of the air fuel mixture in each cylinder. The ECU 14 and the microprocessor 18 are mutually connected with each other through an interface (I/F) 13.

Now, the configuration of the microprocessor 18 will be described below. The microprocessor 18 includes an A/D converter 4 for converting an ionic current signal of the ionic current detection circuit 3, which corresponds to the ionic current generated upon combustion, from analog into digital form, a mask means 5A for masking the ionic current signal A/D converted by the A/D converter during a predetermined time, an extraction means 6 for extracting the ionic current signal at prescribed intervals, and a first ionic current signal gradient calculation means 7 and a second ionic current signal gradient calculation means 8 serially arranged with each other for detecting the gradient of the ionic current signal at prescribed intervals.

The microprocessor 18 further includes a smoothing means 9 for smoothing the gradient of the ionic current detected by the second ionic current signal gradient calculation means 8, a threshold means 10 for setting a threshold which is used for comparison with the smoothed gradient of the ionic current from the smoothing means 9, a combustion determination count means 11 for counting the result of comparison with the threshold thus set, and a combustion determination output means 12 for determining an occurrence of combustion or misfiring in each cylinder based on the number of counts made by the combustion determination count means 11.

First of all, reference will be made to how to detect an occurrence of combustion or misfiring in the internal combustion engine by the use of an ionic current according to the present invention. It is known that ions and electrons generated upon combustion of an air fuel mixture in an engine cylinder can be detected as a current (i.e., ionic current) by impressing a bias voltage thereon in the cylinder. At this time, when combustion has not taken place, no current is detected or there is generated only a leakage current decreasing monotonously except for ignition noise, external noise, or noise generated immediately after or at the moment when the bias voltage is impressed on the air fuel mixture in the cylinder.

On the other hand, when combustion has taken place, an ionic current generated upon combustion repeats a series of cycles of increasing and thereafter decreasing several times. Concretely, cycles generated during normal combustion are a cycle according to combustion chemical changes and a cycle according to pressure and temperature changes, and other than these there is a case where there is generated an increasing cycle of an ionic current due to residual gases.

An ionic current generated upon combustion is detected, and combustion or misfiring is determined according to the detection result of such an ionic current.

Next, the operation of the first embodiment of the present invention will be explained while referring to FIG. 2 through FIG. 5 in addition to FIG. 1.

Figure 2:
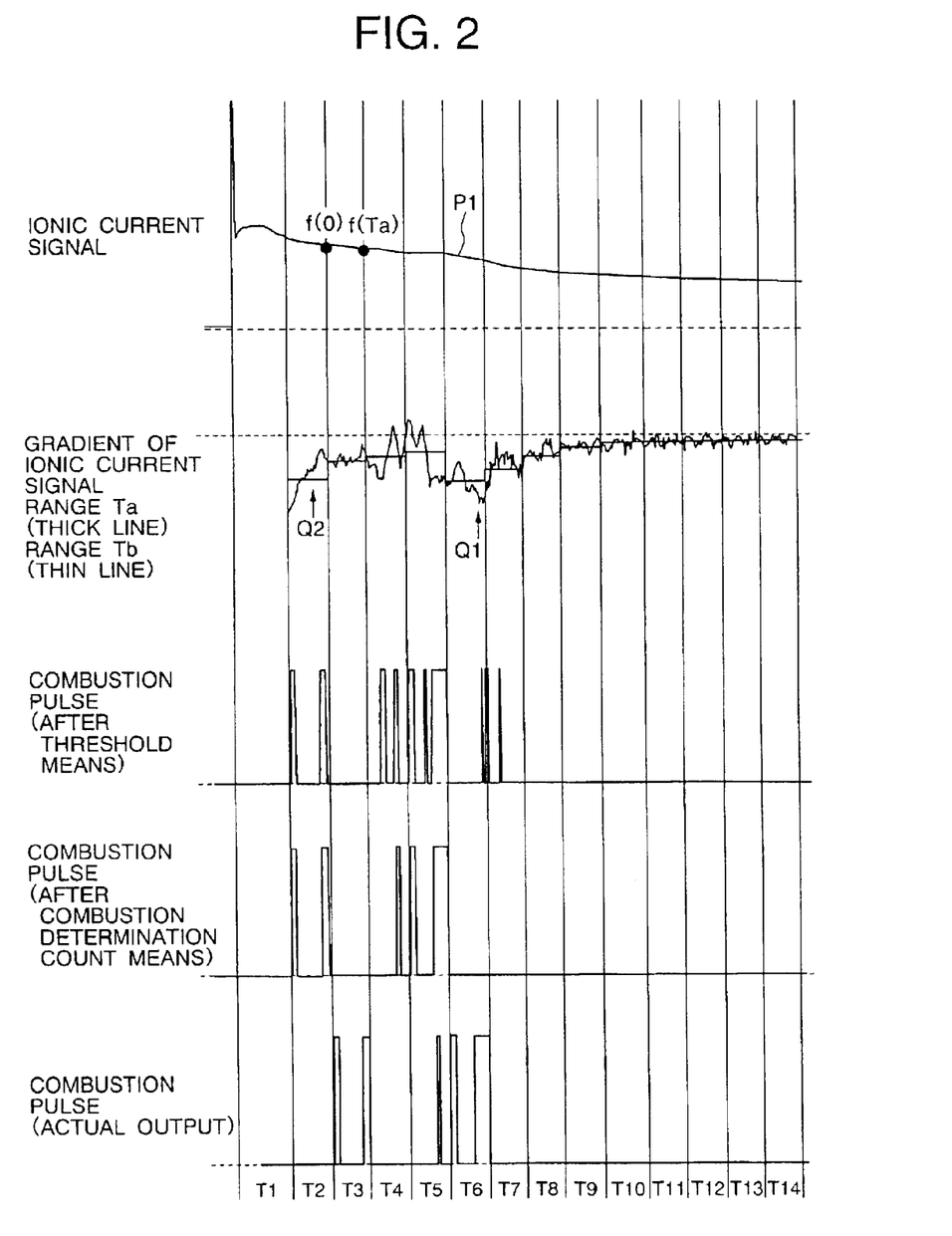
FIG. 2 is a timing chart illustrating the operation of the misfire detection apparatus for an internal combustion engine according to the first embodiment.

FIG. 2 is a timing chart that explains the operation of the first embodiment of the present invention.

Figure 3:
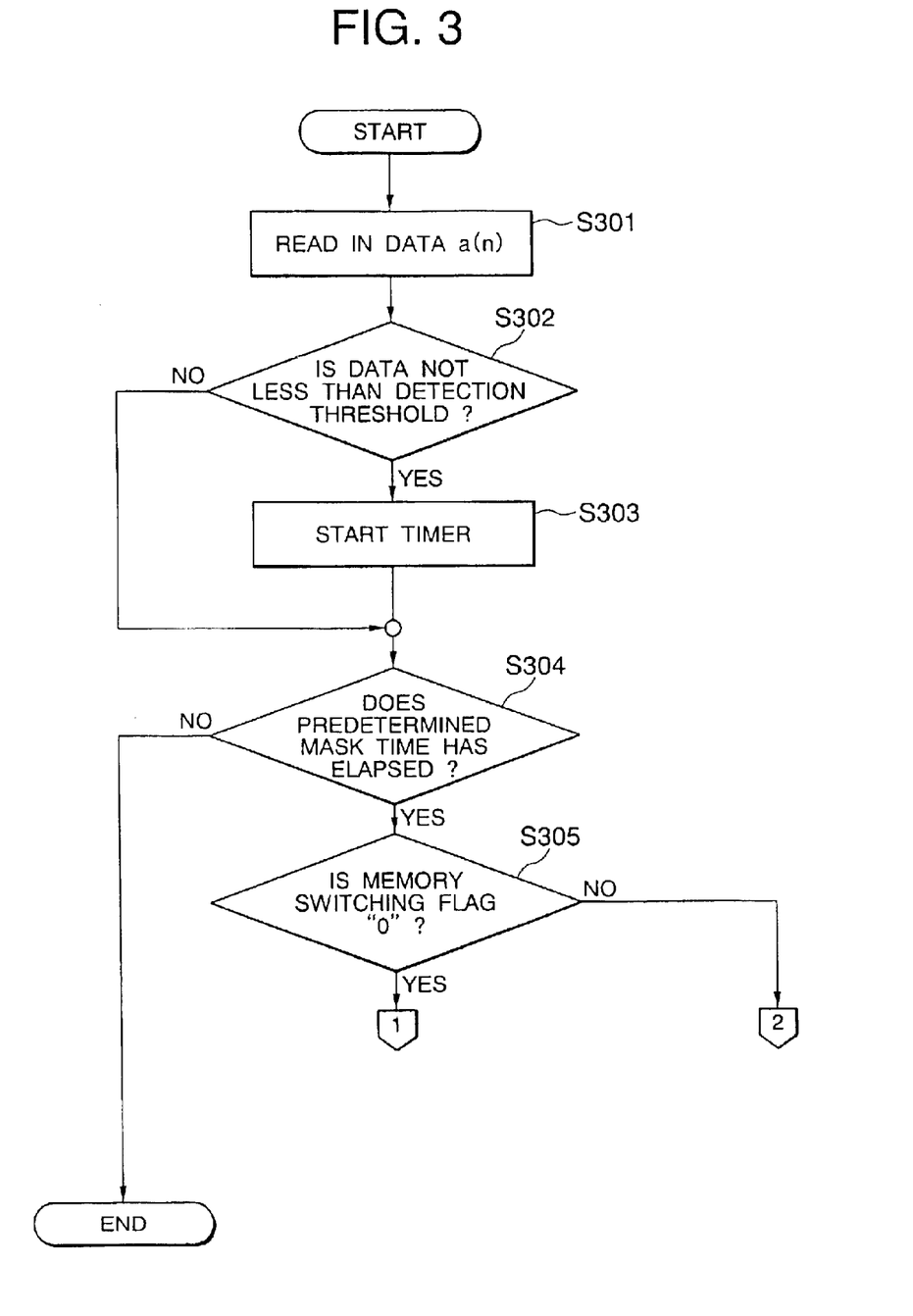
FIG. 3 is a flow chart illustrating the operation of the misfire detection apparatus for an internal combustion engine according to the first embodiment.
Figure 4:
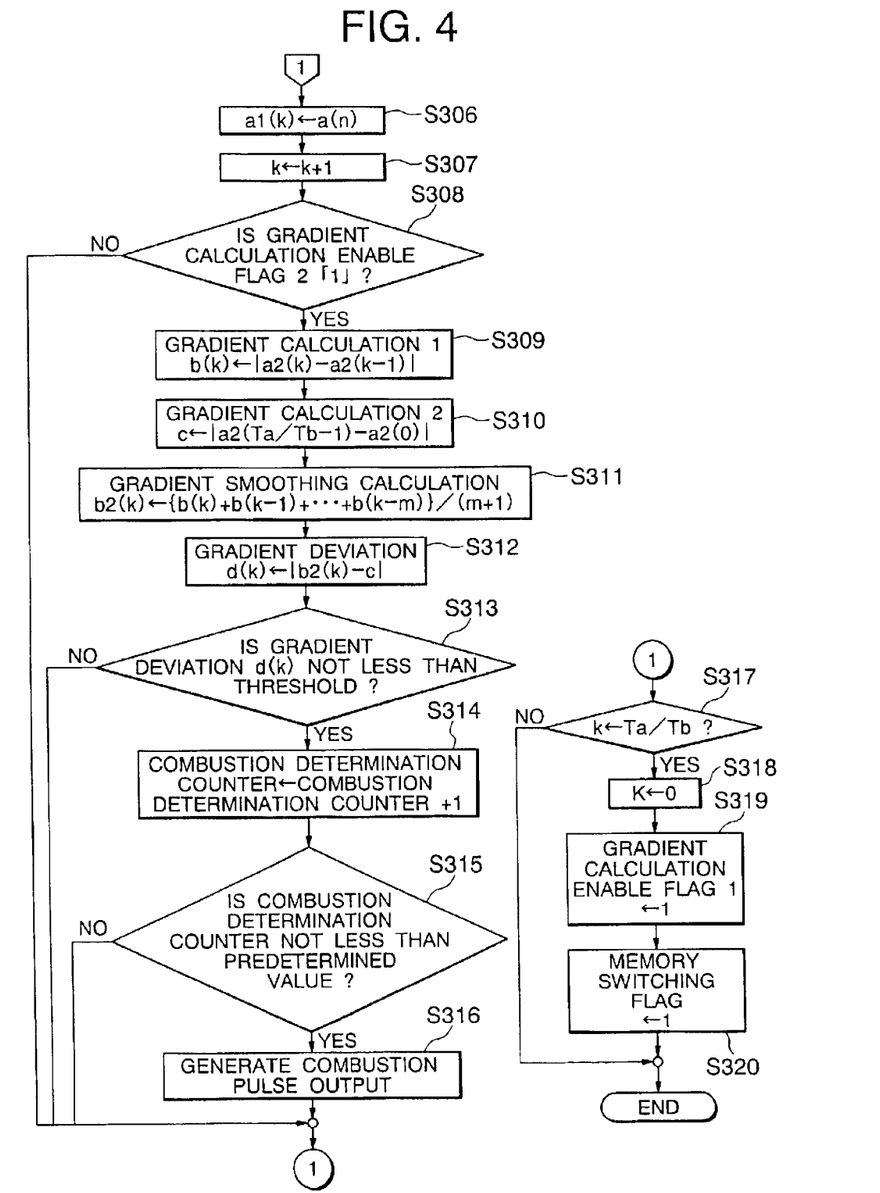
FIG. 4 is a flow chart continued from FIG. 3, illustrating the operation of the misfire detection apparatus for an internal combustion engine according to the first embodiment.
Figure 5:
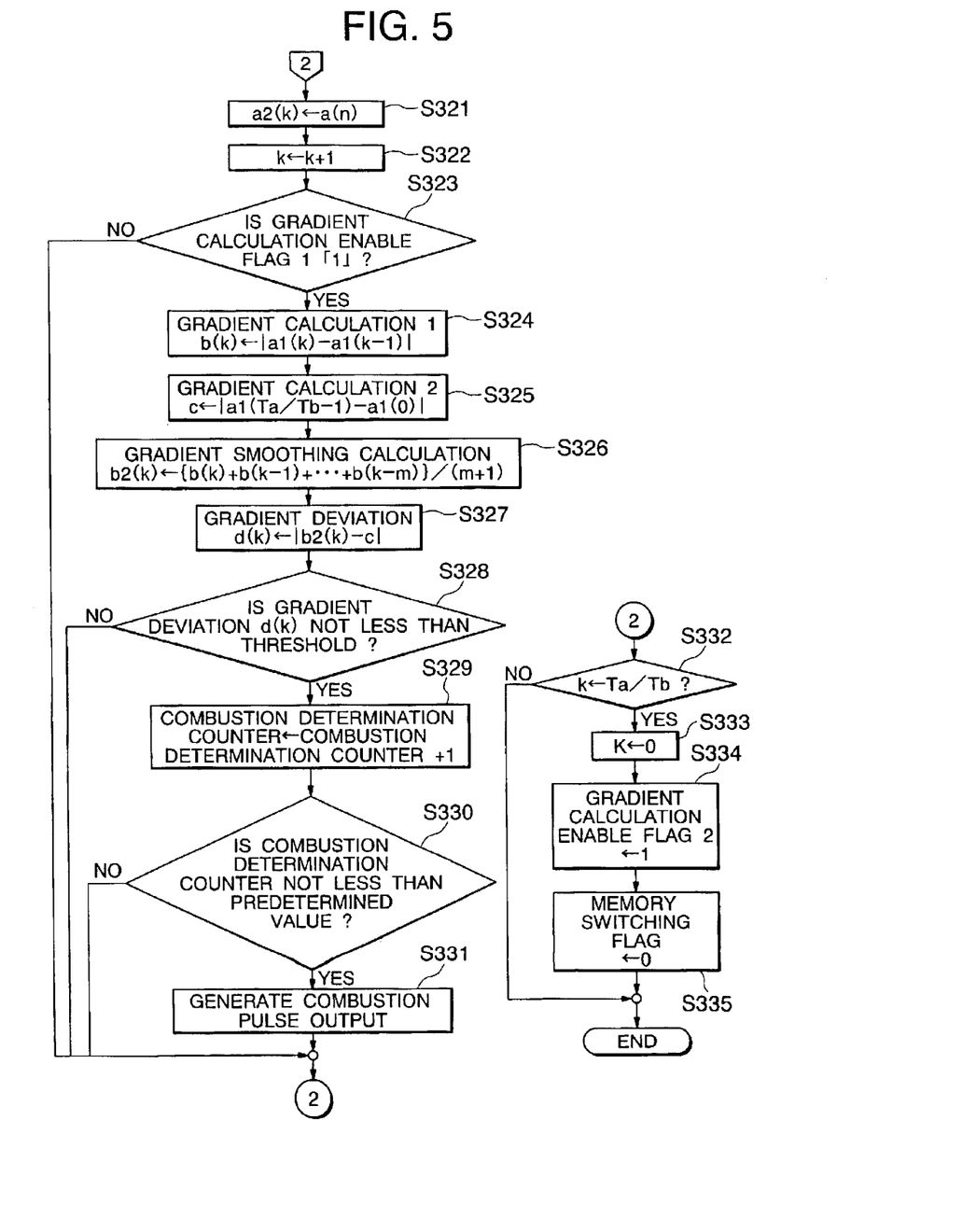
FIG. 5 is a flow chart continued from FIG. 3, illustrating the operation of the misfire detection apparatus for an internal combustion engine according to the first embodiment.

FIG. 3 through FIG. 5 are flow charts illustrating the operation of the first embodiment of the present invention.

In FIG. 1, the supply of electric power to the unillustrated power transistor is turned on and off under the control of the ECU 14 through the interface (I/F circuit) 13 to energize or deenergize the primary winding of the ignition coil 1, so that a high voltage is generated in the secondary winding of the ignition coil 1 upon turning off of the power transistor. The high voltage thus generated in the secondary winding is impressed on an appropriate one of the spark plugs 20 (though only one being illustrated) through the unillustrated distributor whereby an electric discharge is caused in a gap between electrodes of the spark plug 20 to fire or ignite an air fuel mixture in a corresponding cylinder.

In addition, upon ignition, the bias power supply 2A is charged by a part of the ignition energy generated in the ignition coil 1, thereby producing a bias voltage for use with the detection of an ionic current. The bias voltage is impressed on the related spark plug 20 through the ignition coil 1 whereby ions generated upon combustion of the air fuel mixture are caused to move, thus generating a flow of an ionic current. The ionic current is detected and converted to a corresponding voltage by the ionic current detection circuit 3, and then supplied therefrom to the microprocessor 18 as an ionic current signal representative of the thus converted voltage.

The A/D converter 4 in the microprocessor 18 converts the ionic current signal from analog data to digital data at prescribed sampling time intervals Tb.

The mask means 5A masks the ionic current signal during a predetermined time, thus cutting noise (i.e., range T1 in FIG. 2) in the ionic current signal generated upon impression of the bias voltage.

The extraction means 6 divides or separates the ionic current signal after the lapse of the mask time at predetermined time intervals Ta (i.e., time interval longer than the sampling time interval Tb), as shown by ranges T2 through T14 in FIG. 2, and extracts data groups in the unit of the time interval Ta as one set.

The first ionic current signal gradient calculation means 7 calculates a gradient between each piece of data and the immediately preceding piece of data in data groups at sampling time intervals Tb within each time interval Ta to obtain gradients (i.e., amounts of data change) b(k) at sampling time intervals Tb.

The second ionic current signal gradient calculation means 8 calculates a gradient c (e.g., Q2 in FIG. 2) of the ionic current signal in the entire time interval Ta (each time interval Ta) by using a leading end data piece (f(0) in FIG. 2) and a trailing end data piece (f(Ta) in FIG. 2) with respect to the time axis from among data groups within each time interval Ta extracted by the extraction means 6.

The smoothing means 9 calculates an average value b2(k) (e.g., Q1 of FIG. 2) of the gradients b(k) of respective pieces of data from the leading end data piece (e.g., f(0) in FIG. 2) based on gradients b(k) at time intervals Tb calculated by the first ionic current signal gradient calculation means 7, thereby canceling influences of small or minute noise on the ionic current signal.

The threshold means 10 calculates a deviation (gradient deviation) d(k) between the gradient c and each smoothed gradient b2(k), and compares it with a prescribed threshold. When the state in which the gradient deviation d(k) is equal to or greater than the prescribed threshold continues, the combustion determination count means 11 counts the number of continuations.

When the number of counts (number of continuations) of the combustion determination count means 11 is equal to or more than a prescribed value, the combustion determination output means 12 determines an occurrence of "combustion", and sends a combustion pulse to the ECU 14 through the interface 13.

Now, the operation of the microprocessor 18 will be explained in detail.

In FIG. 3, the microprocessor 18 performs A/D conversion of the ionic current signal by means of the A/D converter 4 at the sampling time intervals Tb, and reads in the data (P1 in FIG. 2) thus A/D converted and sampled (step S301). The data thus read in is compared with a detection threshold for masking the ionic current signal, and it is determined whether the data is equal to or greater than the detection threshold (step S302).

When the data is equal to or greater than the detection threshold in step S302 (that is, YES), the mask means 5A starts the timer to count the mask time (step S303). On the other hand, when the data is smaller than the detection threshold (that is, NO), the control flow proceeds to step S304 while skipping step S303.

Subsequently, the mask means 5A makes a determination as to whether a predetermined mask time (mask period) (e.g., range T1 in FIG. 2) has elapsed, while referring to the timer (step S304).

When the mask time has not yet elapsed in step S304 (that is, NO), the data read in is disregarded and is not taken into a memory means (not shown) until the mask time has elapsed.

When the mask time has elapsed (that is, YES), the data in the unit of the sampling time interval Tb taken into the microprocessor 18 is sequentially stored in the memory means in the microprocessor which is arranged in such a manner as a(1), a(2), a(3) . . . , for instance. (That is, the data of the ionic current signal from T2 afterwards in FIG. 2 is stored.)

Note that the time interval at which the data is stored in the memory means is the time interval Tb that is the sampling time interval at which the data is sampled in the A/D converter 4. That is, the time interval, at which the following piece of data is stored in an array a(2) in the memory means after a piece of data has been stored in an array a(1), is Tb.

In addition, the data, which has been taken into the microprocessor 18 during a period of time from the start of the timer until the mask time has elapsed, is not stored in the memory means but simply disregarded.

The memory means (buffer) for storing data comprises two memories (a1(k), a2(k)), and the determination processing is performed for the data that has already been stored in one of the memories for use with calculations, while storing data in the other memory which functions as data storage. When the determination processing for the data stored in the one memory is finished, a switching or exchanging between the memories is carried out. That is, the one memory which is used as data storage for storing data is switched into a memory for use with calculations, whereas the other memory whose data is used for calculations or determination processing is switched into a memory for data storage, and such a switching is carried out repeatedly.

A flag (i.e., memory switching flag) is used for the switching or exchanging of the memories. When the processing of data groups in each time interval Ta is finished, the content of the flag is changed for switching or exchanging the memories so that the processing of the data in the following time interval Ta is carried out.

The memory for data storage stores a group of pieces of data within the time interval Ta. A group of pieces of data is sequentially stored in the storage area a1 in the data storage memory in such a manner that the leading or first piece of data, the second piece of data, . . . , the last piece of data in a time interval Ta are stored in the first region a1(1), the second region a1(2), . . . , the last region a1(Ta/Tb−1), respectively, in the data storage area a1. Similarly, a group of pieces of data is also stored in the storage area a2 in the calculation data memory. In this manner, the number of pieces of data stored in each memory is a value obtained by dividing the time interval Ta by the sampling time interval Tb.

Here, note that the time interval Ta and the sampling time interval Tb are set in such a manner that the value thus obtained by dividing the time interval Ta by the sampling time interval Tb becomes an integer.

In step S305, it is determined whether the memory switching flag is "0".

When the memory switching flag is "0" in step S305 (that is, YES), the processes from step S306 to step S320 in FIG. 4 are performed, whereas when the memory switching flag is not "0" (that is, NO), the processes from step S321 to step S335 in FIG. 5 are performed.

The operation of this embodiment carried out when the memory switching flag is "0" in step S305 will be explained.

In FIG. 4, a piece of data a(n) is stored in the memory region a1(k) in the data storage memory (step S306). Then, a counter k for counting pieces of data within the time interval Ta is incremented by 1 (step S307).

A memory switching cycle (time interval) Ta for switching the data storage memory and the calculation data memory can be detected by the counting of the counter k.

Subsequently, it is determined whether a gradient calculation enable flag 2 is "1" (step S308). If all the pieces of data in the data group within the time interval Ta have been stored in the storage area a2 of the calculation data memory, the gradient calculation enable flag 2 is set to "1", and the gradient calculation from the next step is started. When all the pieces of data within the time interval Ta have not yet been stored, as for example immediately after the lapse of the mask time, the gradient calculation enable flag 2 is set to "0".

When the gradient calculation enable flag 2 is not "1" in step S308 (that is, NO), the processes from step S309 to step S316 are skipped, whereas when the gradient calculation enable flag 2 is "1" (that is, YES), the gradient calculation is carried out by the first ionic current signal gradient calculation means 7 (step S309).

The gradient calculation performed by the first ionic current signal gradient calculation means 7 calculates a gradient b(k) between the present piece of data a2(k) and the last piece of data a2(k−1) based on the data stored in the calculation data memory according to the following expression (1).

$$b(k)=|a2(k)-a2(k-1)| \qquad (1)$$

The gradient b(k) thus calculated indicates the gradient of the ionic current signal though not divided by the sampling time interval Tb of the microprocessor 18.

Subsequently, the gradient calculation according to the second ionic current signal gradient calculation means 8 is performed. This gradient calculation calculates the gradient c using the leading or first piece of data and the trailing or last piece of data within the time interval Ta according to the following expression (2) (step S310).

$$c=|a2(Ta/Tb-1)-a2(0)/(Ta/Tb)| \qquad (2)$$

Thereafter, the smoothing means 9 smoothes the gradients according to the following expression (3) by the use of the data from the first piece of data b(0) to the present piece of data b(k) within the time interval Ta as calculated in step S309 (step S311).

$$b2(k)=\{b(k)+b(k-1)+\ldots+b(k-m)\}/(m+1) \qquad (3)$$

The smoothed gradient b2(k) indicates the tendency of the gradient of the ionic current signal.

The threshold means 10 calculates a gradient deviation d(k) based on the smoothed gradient b2(k) and the gradient c in the time interval Ta according to the following expression (4) (step S312), and determines whether the gradient deviation d(k) is equal to or greater than a threshold (step S313).

$$d(k)=|b2(k)-c| \qquad (4)$$

When the gradient deviation d(k) thus calculated is smaller than the threshold in step S313 (that is, NO), a combustion counter counting when the gradient deviation d(k) is equal to or greater than the threshold is set to "0", and the processes from step S314 to step S316 are skipped. On the other hand, when the gradient deviation d(k) is equal to or greater than the threshold (that is, YES), the combustion determination count means 11 increments the combustion determination counter by "1" (step S314).

Then, the combustion determination output means 12 determines whether the count of the combustion determination counter is equal to or more than a prescribed value (step S315).

When the count of the combustion determination counter is equal to or more than the prescribed value in step S315 (that is, YES), a determination of "combustion" is made, and a combustion pulse is sent to the ECU 14 through the interface 13 (step S316), whereas when the count of the combustion determination counter is smaller than the prescribed value (that is, NO), a determination of "misfire" is made, and step S316 is skipped.

Thus, when the gradient deviation d(k) even if greater than the threshold does not continue for the predetermined time, a determination of "combustion" is not made.

FIG. 2 shows a pulse waveform (combustion pulse after the threshold means) when a combustion pulse is output after a comparison is made in the threshold means 10, and a pulse waveform (combustion pulse after the combustion determination count means) when a combustion pulse is output after the count result is determined by the combustion determination count means 11.

However, note that the determination processing for the last stored data group is performed while data is being stored in the data storage memory. Thus, a data group for gradient calculations are stored in the data storage memory only for the time Ta after the data of the ionic current signal has been input. Accordingly, the actual sending of the combustion pulse (combustion pulse (actual output) in FIG. 2) is delayed by the time Ta with reference to the ionic current signal input.

Subsequently, according to the following expression (5), it is determined whether the counter k has counted all the pieces of data in the data group within the time interval Ta (step S317).

$$k=Ta/Tb \qquad (5)$$

When all the pieces of data in the data group within the time interval Ta have not yet been counted in step S317 (that is, NO), the processes from step S318 to step S320 are skipped, and the determination processing of the remaining data is performed.

On the other hand, when all the pieces of data in the data group within the time interval Ta have been counted in step S317 (that is, YES), the counter k is set to "0" (step S318), and the gradient calculation flag 1 is set to "1" (step S319), and the memory switching flag is set to "1" (step S320), so that the determination processing for the following time interval Ta is performed.

When the memory switching flag is set to "1" after the lapse of the time Ta in step S320, the calculation data memory and the data storage memory are switched to the storage areas a1 and a2, respectively, and similar gradient calculation processing is carried out for the data stored in the memory area a1, while data is stored in the memory area a2 (see FIG. 5). That is, when the memory switching flag is "0" in a range T2 in FIG. 2, it then becomes "1" in the following range T3, whereby the data storage memory and the calculation data memory are alternately switched or exchanged to each other at the unit time interval Ta, and hence the processing routines of FIG. 4 and FIG. 5 are switched to each other.

Here, note that the content of processing of FIG. 5 is the same as that of FIG. 4 excepting that the data storage memory and the calculation data memory are exchanged with each other, and hence a description of the operation of FIG. 5 is omitted.

Thus, a leakage current is contained in the ionic current, and when a comparison is made between a gradient of the ionic current signal detected at detection intervals T50 in a range K1 and a gradient A of the ionic current signal detected in a detection interval T51 longer than the detection interval T50 in the same range, a gradient deviation d(k) equal to or greater than a prescribed value comes out, as shown in FIG. 10. Therefore, a determination of combustion or misfiring can be made based on the gradient deviation thus calculated from both of these gradients.

Accordingly, even in cases where a leakage current is generated with an ionic current decreasing monotonously in the absence of any increasing range of the ionic current, combustion or misfiring can be detected.

In addition, an occurrence of combustion is not determined only through a comparison between the gradient deviation d(k) and the threshold, but such a determination of combustion is made only when the time during which the gradient deviation d(k) is equal to or greater than the threshold becomes equal to or longer than the predetermined time. As a result, malfunctions due to a change in the gradient of the ionic current signal caused by minute but large noise occurring abruptly can be prevented.

Although the microprocessor (microcomputer) 18 has been used for operational processing, there may instead be employed a digital signal processor or a logic IC composed of gate array circuits.

Also, though the counter k has been used for detecting the time interval or period Ta, the passage of time may be recognized by the use of a timer.

Although the timer has been used for recognizing the mask time of the ionic current signal in the mask means 5A, the lapse of the mask time may be determined by the lapse of a prescribed number of counts by using a counter in place of the timer.

Moreover, the noise generated during impression of a bias voltage has been masked by the mask means 5A to prevent resultant malfunctions, but malfunctions due to such noise may be avoided by using, instead of the mask means 5A, a window means for taking out the ionic current signal only in a range or ranges where an ionic current signal is wanted to be detected.

Note that by detecting the combustion state in each cylinder of an internal combustion engine, such as the number of revolutions per minute of the engine, the engine load, the internal pressure in each cylinder, the amplitude of the ionic current signal, the sum $\Sigma d(k)$ of gradient deviations within a predetermined time, the ratio of air to fuel in the air fuel mixture, etc., it may be possible to set, as the time intervals Ta, Tb, values according to the combustion state of the engine thus detected.

For instance, by setting the time intervals Ta and Tb shorter at a high rotational speed range than at a low rotational speed range, a change in the ionic current due to combustion can be captured in a reliable manner. Therefore, accuracy in the misfire detection can be improved as compared with the case where the time intervals are not changed.

Further, note that the ranges of the ionic current for calculating the gradients thereof have uniformly been set at equal intervals such as the time intervals Ta, Tb, but they may be set in such a manner that each range overlaps an immediately preceding range.

For instance, the range T3 in FIG. 2 may be started from an intermediate point within the range T2 so that these time ranges are partially overlapped each other. Thus, in this case, the frequency or number of times of detecting gradients in the time intervals Ta, Tb is increased to improve the accuracy of the gradients detected. As a consequence, the change of the ionic current signal can be caught in a more reliable manner.

Embodiment 2.

Although in the above-mentioned first embodiment, a deviation between two gradients has been calculated to determine an occurrence of combustion or misfiring, such a determination can be made based on either one of the two gradients alone according to a second embodiment of the present invention.

The configuration of this second embodiment of the present invention is the same as that of the above-mentioned first embodiment (see FIG. 1), and hence a detailed explanation thereof is omitted.

Also, a part of the operation of the second embodiment is the same as the processing of FIG. 3, and hence a detailed explanation thereof is omitted.

Figure 6:
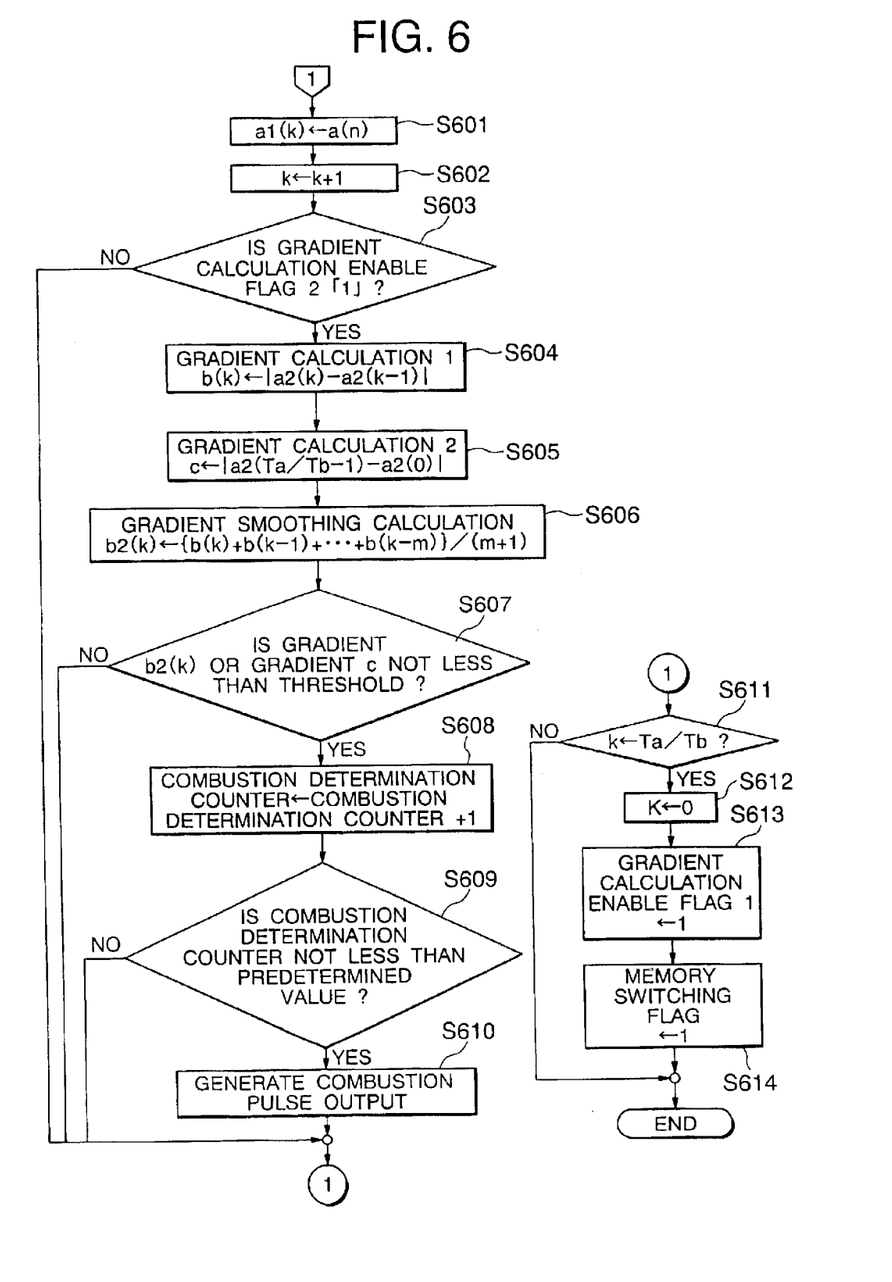
FIG. 6 is a flow chart illustrating the operation of a misfire detection apparatus for an internal combustion engine according to a second embodiment of the present invention.

FIG. 6 is a flow chart illustrating the remaining part of the operation of the second embodiment of the present invention. Steps S601–S606 and S608–S614 in FIG. 6 correspond to steps S306–S311 and S314–S320, respectively, in FIG. 4, thus omitting a detailed explanation thereof.

In FIG. 6, it is determined whether a gradient b2(k) detected and smoothed by the first ionic current signal gradient calculation means 7 within a time interval Tb is a positive value which is equal to or greater than a threshold, and it is also determined whether a gradient c detected by the second ionic current signal gradient calculation means 8 within a time interval Ta is a positive value which is equal to or greater than the threshold (step S607).

When the gradient b2(k) or the gradient c is equal to or greater than the threshold in step S607 (that is, YES), a combustion determination counter for the gradient equal to or greater than the threshold is incremented by "1" (step S608).

When both the gradient b2(k) and the gradient c are smaller than the threshold (that is, NO), combustion counters for the gradient b2(k) and the gradient c are set to "0", and processes from step S608 to step S610 are skipped.

Then, the combustion determination output means 12 determines whether the count of the combustion determination counter for the gradient b2(k) is equal to or greater than a prescribed value, and whether the count of the combustion determination counter for the gradient c is equal to or greater than the prescribed value (step S609).

When the count of either one of the combustion determination counters is equal to or greater than the prescribed value in step S609 (that is, YES), a determination of "combustion" is made, and a combustion pulse is sent to the ECU 14 through the interface 13 (step S610). On the other hand, when the counts of both of the combustion determination counters are smaller than the prescribed value (that is, NO), a determination of "misfire" is made, and step S610 is skipped. Thus, when the gradient b2(k) detected and smoothed by the first ionic current signal gradient calculation means 7 within the time interval Tb has a positive value equal to or greater than the threshold consecutively a predetermined number of times or more, or when the gradient c detected by the second ionic current signal gradient calculation means 8 within the time interval Ta has a positive value equal to or greater than the threshold consecutively a predetermined number of times or more, a determination of "combustion" is made.

Here, note that in the case of the detected ionic current signal being negative, when the ionic current signal has a negative gradient whose absolute value is equal to or greater than the threshold, it is determined as "combustion".

Accordingly, even in cases where a leakage current is generated with an ionic current decreasing monotonously in the absence of any increasing range of the ionic current, combustion and misfiring can be detected.

Although determinations have been made by using the smoothed gradient b2(k) in step S607, the gradient b(k) before being smoothed may be used.

Here, note that the content of processing of this second embodiment after a switching of the memories is the same as that before the switching except for the fact that the data storage memory and the calculation memory are exchanged with each other, as in the relation between the processing of FIG. 4 and the processing of FIG. 5. According, such processing is similar to that of FIG. 6, and hence a description of this processing is omitted.

Embodiment 3.

Although in the above-mentioned first embodiment, a deviation between the gradient c in the time interval Ta and the gradient b(k) in the time interval Tb has been calculated to make a determination of "combustion" or "misfiring", such a determination can be made by using the sum of gradients b(k) within a time interval Tc in accordance with a third embodiment of the present invention.

The configuration of this third embodiment of the present invention is the same as that of the above-mentioned first embodiment (see FIG. 1), and hence a detailed explanation thereof is omitted. Also, a part of the operation of the third embodiment is the same as the processing of FIG. 3, and hence a detailed explanation thereof is omitted.

Figure 7:
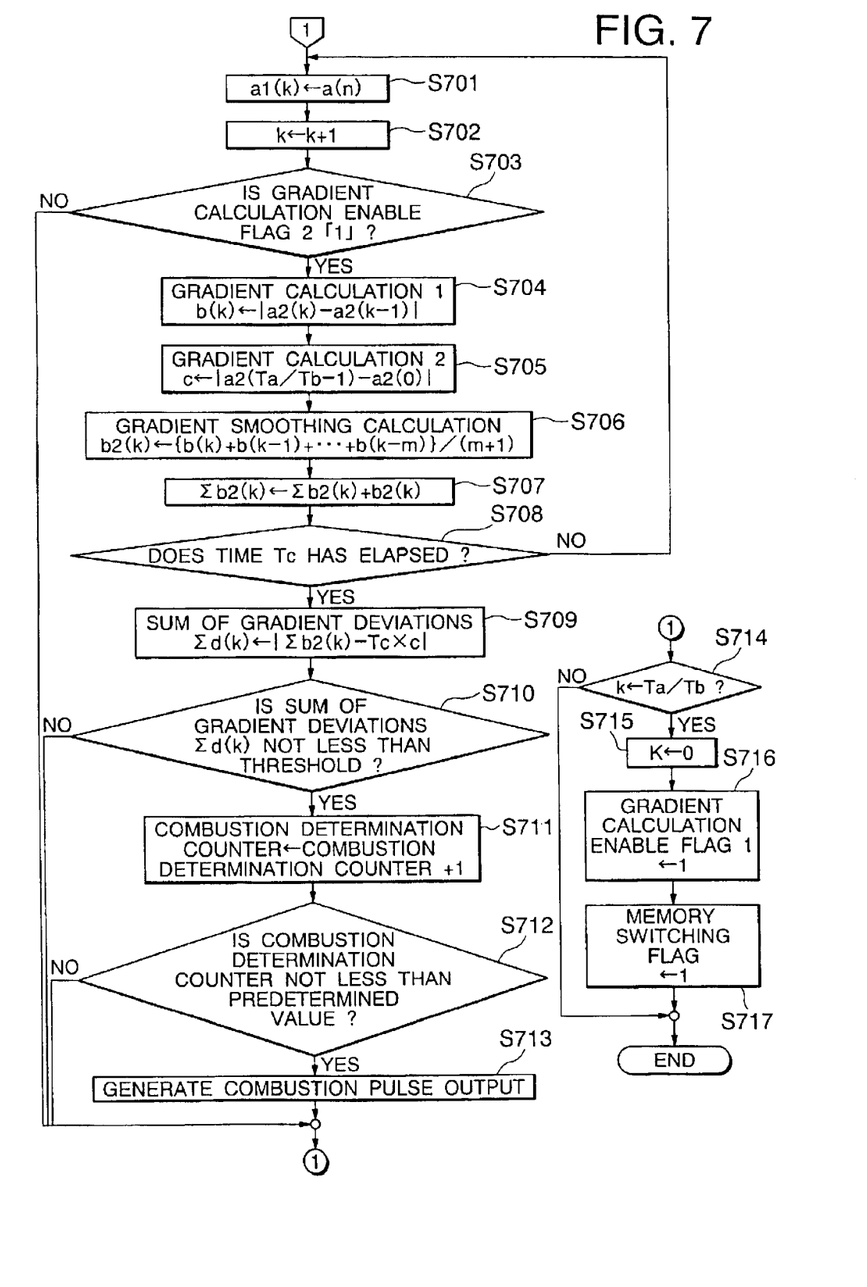
FIG. 7 is a flow chart illustrating the operation of a misfire detection apparatus for an internal combustion engine according to a third embodiment of the present invention.

FIG. 7 is a flow chart illustrating the remaining part of the operation of the third embodiment of the present invention. Steps S701–S706 and S711–S717 in FIG. 7 correspond to steps S306–S311 and S314–S320, respectively, in FIG. 4, thus omitting a detailed explanation thereof.

In FIG. 7, a smoothed gradient b2(k) is added to the sum of gradients Σb2(k) (step S707).

Then, it is determined whether the predetermined time interval Tc (Tb<Tc<Ta) has elapsed (step S708). When the time interval Tc has not yet elapsed (that is, NO), a return to step S701 is carried out and gradients b2(k) are added to the sum of gradients Σb2(k) until the time interval Tc has elapsed.

When the time interval Tc has elapsed in step S708 (that is, YES), the sum (i.e., sum of gradient deviations) Σd(k) of deviations between the sum of smoothed gradients b2(k) in the time interval Tc and the product of the gradient c in the time interval Ta and the time interval Tc is calculated by the following expression (6) (step S709).

$$\Sigma d(k) = |\Sigma b2(k) - c \times Tc| \quad (6)$$

Subsequently, it is determined whether the sum Σd(k) of gradient deviations thus calculated is equal to greater than a threshold (step S710). When the sum Σd(k) of gradient deviations is equal to or greater than the threshold (that is, YES), the combustion determination counter is incremented by "1" (step S711), whereas the sum Σd(k) of gradient deviations is smaller than the threshold (that is, NO), processes from step S711 to step S713 are skipped.

Then, it is determined whether the count of the combustion determination counter is equal to or greater than a prescribed value (step S315). When the count of the combustion determination counter is equal to or greater than the prescribed value (that is, YES), a determination of "combustion" is made, thus outputting a combustion pulse (step S713), whereas when the count of the combustion determination counter is smaller than the prescribed value, a determination of "misfire" is made, and step S713 is skipped.

Accordingly, even in cases where a leakage current is generated with an ionic current decreasing monotonously in the absence of any increasing range of the ionic current, combustion or misfiring can be detected.

Here, note that the content of processing of this third embodiment after a switching of the memories is the same as that before the switching excepting that the data storage memory and the calculation memory are exchanged with each other, as in the relation between the processing of FIG. 4 and the processing of FIG. 5. Thus, such processing is similar to that of FIG. 6, and hence a description of the processing is omitted.

As described above, the present invention provides the following excellent advantages.

A misfire detection apparatus for an internal combustion engine according to the present invention includes, a ionic current detector for detecting an ionic current signal corresponding to an ionic current generated when an air fuel mixture in a combustion chamber in each cylinder of the internal combustion engine is combusted, a gradient detector for detecting a first gradient of the ionic current signal at first detection intervals and a second gradient of the ionic current signal at second detection intervals longer than the first detection intervals, and a determiner for determining an occurrence of combustion or misfiring in the combustion chamber based on the first and second gradients of the ionic current signal. With the above arrangement, even in cases where a leakage current is generated with an ionic current decreasing monotonously in the absence of any increasing range of the ionic current, combustion or misfiring can be detected.

In a preferred form of the present invention, the determiner calculates a deviation between the first gradient and the second gradient, and makes a determination of combustion or misfiring in the combustion chamber by comparing the deviation with a threshold. Thus, it is possible to determine an occurrence of combustion or misfiring even when there takes place a leakage current with an ionic current decreasing monotonously in the absence of any increasing range of the ionic current.

In another preferred form of the present invention, the determiner calculates a sum of deviations between the first gradient and the second gradient and a product of a third detection interval and the second gradient at the third detection intervals which are longer than the first detection intervals and shorter than the second detection intervals, and makes a determination of combustion or misfiring in the combustion chamber by comparing a deviation between the sum of deviations and the product with a threshold. Accordingly, an occurrence of combustion or misfiring can be determined even where a leakage current is generated with an ionic current decreasing monotonously in the absence of any increasing range of the ionic current.

In a further preferred form of the present invention, the determiner comprises, threshold unit for setting the threshold and making a comparison between the deviation and the threshold, combustion determination counting unit for counting the number of times of consecutive determinations in which the deviation is equal to or greater than the threshold, and combustion determination output unit for determining an occurrence of combustion or misfiring in the combustion chamber by comparing the number of times of consecutive determinations and a prescribed value. Thus, malfunctions due to a change in the gradient of the ionic current caused by minute but large noise occurring abruptly can be prevented.

In a still further preferred form of the present invention, the misfire detection apparatus for an internal combustion engine further comprises mask unit for masking the ionic current signal during a prescribed period of time after firing of the air fuel mixture. Thus, malfunctions due to a change in the gradient of the ionic current caused by noise occurring upon impression of a bias voltage can be prevented.

In a yet further preferred form of the present invention, the gradient detector is provided with window unit for taking out the ionic current signal only for a prescribed period of time. Accordingly, malfunctions due to a change in the gradient of the ionic current caused by noise occurring upon impression of a bias voltage can be prevented, and the gradient of the ionic current signal in a range desired to be extracted can be detected by the state of combustion in the combustion chamber in each cylinder of the internal combustion engine.

In a further preferred form of the present invention, the gradient detector sets at least one of the first and second detection intervals by virtue of a parameter that represents the state of combustion in the combustion chamber. Thus, the gradient of the ionic current signal, which is varied according to the state of combustion, can be detected in an accurate manner.

In a further preferred form of the present invention, at least one of the first and second detection intervals includes a plurality of detection ranges, and the gradient detector sets each of the detection ranges in at least one of the first and second detection intervals in such a manner as to overlap an immediately preceding detection range. Thus, it is possible to detect the gradient of the ionic current signal which is varied according to the state of combustion.

In a further preferred form of the present invention, the misfire detection apparatus for an internal combustion engine further comprises smoothing unit for smoothing at least one of the first and second gradients. Thus, it is possible to detect a change in the ionic current caused by combustion in a reliable manner without being influenced by a minute change in noise or the like.

While the invention has been described in terms of preferred embodiments, those skilled in the art will recognize that the invention can be practiced with modifications within the spirit and scope of the appended claims.

What is claimed is:

1. A misfire detection apparatus for an internal combustion engine comprising:

ionic current detection means for detecting an ionic current signal corresponding to an ionic current generated when an air fuel mixture in a combustion chamber in each cylinder of the internal combustion engine is combusted;

gradient detection means for detecting a first gradient of the ionic current signal at first detection intervals and a second gradient of the ionic current signal at second detection intervals longer than the first detection intervals; and determination means for determining an occurrence of combustion or misfiring in said combustion chamber based on the first and second gradients of the ionic current signal.

2. The misfire detection apparatus for an internal combustion engine according to claim 1, wherein said determination means calculates a deviation between the first gradient and the second gradient, and makes a determination of combustion or misfiring in said combustion chamber by comparing said deviation with a threshold.

3. The misfire detection apparatus for an internal combustion engine according to claim 1, wherein said determination means calculates a sum of deviations between the first gradient and the second gradient and a product of a third detection interval and the second gradient at the third detection intervals which are longer than the first detection intervals and shorter than the second detection intervals, and makes a determination of combustion or misfiring in said combustion chamber by comparing a deviation between said sum of deviations and said product with a threshold.

4. The misfire detection apparatus for an internal combustion engine according to claim 2, wherein said determination means comprises;

threshold means for setting said threshold and making a comparison between said deviation and said threshold;

combustion determination counting means for counting the number of times of consecutive determinations in which said deviation is equal to or greater than said threshold; and combustion determination output means for determining an occurrence of combustion or misfiring in said combustion chamber by comparing said number of times of consecutive determinations and a prescribed value.

5. The misfire detection apparatus for an internal combustion engine according to claim 1, further comprising mask means for masking said ionic current signal during a prescribed period of time after firing of the air fuel mixture.

6. The misfire detection apparatus for an internal combustion engine according to claim 1, wherein said gradient detection means is provided with window means for taking out said ionic current signal only for a prescribed period of time.

7. The misfire detection apparatus for an internal combustion engine according to claim 1, wherein said gradient detection means sets at least one of said first and, second detection intervals by virtue of a parameter that represents the state of combustion in said combustion chamber.

8. The misfire detection apparatus for an internal combustion engine according to claim 1, wherein at least one of said first and second detection intervals includes a plurality of detection ranges, and said gradient detection means sets each of said detection ranges in at least one of said first and second detection intervals in such a manner as to overlap an immediately preceding detection range.

9. The misfire detection apparatus for an internal combustion engine according to claim 1, further comprising smoothing means for smoothing at least one of said first and second gradients.

* * * * *